United States Patent [19]

Takayanagi et al.

[11] Patent Number: 4,861,667
[45] Date of Patent: Aug. 29, 1989

[54] COATING COMPOSITION AND COATED PRODUCT

[75] Inventors: Takashi Takayanagi, Yokohama; Seiji Munekata, Tokyo; Nobuyuki Miyazaki, Yokohama; Ken Moriwaki, Kawasaki, all of Japan

[73] Assignee: Asahi Glass Company, Ltd., Tokyo, Japan

[21] Appl. No.: 133,428

[22] Filed: Dec. 15, 1987

[30] Foreign Application Priority Data

Dec. 19, 1986 [JP] Japan .................................. 61-301558

[51] Int. Cl.$^4$ ............................................. B32B 27/00
[52] U.S. Cl. ..................................... 428/421; 525/103; 525/104
[58] Field of Search ................. 525/104, 103; 428/421

[56] References Cited

U.S. PATENT DOCUMENTS

| | | | |
|---|---|---|---|
| 3,507,844 | 4/1970 | Wood et al. | 525/104 |
| 4,314,043 | 2/1982 | Kojima et al. | 525/104 |

Primary Examiner—Melvyn I. Marquis
Attorney, Agent, or Firm—Oblon, Fisher, McClelland, Maier & Neustadt

[57] ABSTRACT

A coating composition comprising a fluorine-containing copolymer containing at least 10% by weight of fluorine based on fluoroolefin units, being soluble in a solvent and having curable reactive sites, and a polyfunctional organic silicon compound having at least one isocyanate group directly bonded to a silicon atom.

14 Claims, No Drawings

COATING COMPOSITION AND COATED PRODUCT

The present invention relates to a coating composition and a coated product.

A coating composition containing a fluorine-containing polymer as the main component is far superior in the durability as compared with a usual coating composition wherein e.g. an acrylic resin is used. However, a usual coating composition containing a fluorine-containing polymer as the main component had a problem that the fluorine-containing polymer was hardly soluble in a solvent, or soluble only in a specific solvent, and the coating operation tended to be difficult. A fluorine-containing copolymer which overcomes such a problem has been proposed (e.g. Japanese Unexamined Patent Publication No. 96088/1978). Further, a coating composition using such an improved fluorine-containing copolymer is known (e.g. Japanese Unexamined Patent Publications No. 25318/1980 and No. 21686/1981).

In such a coating composition containing a fluorine-containing copolymer as the main component, a polyisocyanate curing agent or a melamine curing agent is used.

When the polyisocyanate curing agent is employed, it is possible to prepare a room temperature curable coating material, but such a coating material has to be a two-part liquid system, whereby two liquids must be mixed at the time of use, such being inconvenient. On the other hand, when melamine is used, the above inconvenience can be eliminated, but a high temperature baking operation is required. Thus, there has been a problem that the coating operation can not be conducted at the site. Conventional curing agents are inferior in the heat resistance to the fluorine-containing copolymer, and there has been a problem that the heat resistance of the fluorine-containing copolymer can not adequately be exhibited by the cured products.

Further, the conventional coating composition containing a fluorine-containing copolymer as the main component requires that primer treatment be applied preliminarily to the surface of the substrate in order to obtain good adhesion to an inorganic substrate such as glass or stainless steel.

It is an object of the present invention to solve the above-mentioned problems inherent to the conventional techniques and to provide a coating composition which is a one-part liquid system and capable of forming a cured coating layer without the necessity of baking and which provides excellent adhesion to an inorganic substrate such as glass or stainless steel without requiring primer treatment and provides excellent weather resistance.

The present invention provides a coating composition comprising a fluorine-containing copolymer containing at least 10% by weight of fluorine based on fluoroolefin units, being soluble in a solvent and having curable reactive sites, and a polyfunctional organic silicon compound having at least one isocyanate group directly bonded to a silicon atom.

The present invention also provides a coated product comprising a substrate and a cured coating layer thereon, wherein the coating layer is formed by the above coating composition.

Now, the present invention will be described in detail with reference to the preferred embodiments.

In the present invention, it is important to use a fluorine-containing copolymer containing at least 10% by weight of fluorine atoms based on fluoroolefin units and having good compatibility or solubility to the specific organic silicon compound and a solvent commonly used for coating material. If the fluorine content is too small, the advantage as the base material for weatherable coating material decreases and the effects for the improvement in the processability of the composition tend to be poor. Not only that, such an inadequate fluorine content is undesirable also from the aspect of the cured coating film properties. Further, fluorine polymers insoluble in various solvents, such as a polytetrafluoroethylene, a tetrafluoroethylene-hexafluoropropylene copolymer, a tetrafluoroethylene-perfluoro(alkyl vinyl ether) copolymer, a polychlorotrifluoroethylene and a tetrafluoroethylene-ethylene copolymer, are not suitable even if they contain at least 10% by weight of fluorine atoms, since they are hardly compatible with the specific organic silicon compound, whereby it will be difficult to accomplish the intertwining of molecular chains or the formation of a network structure. The fluorine content in the specific fluorine-containing polymer in the present invention is usually selected within a range of from 10 to 70% by weight, preferably from 15 to 50% by weight.

As the fluorine-containing polymer in the present invention, it is preferred to employ an addition polymer type from the viewpoint of the processability of the composition and the mechanical properties of the cured film. Further, from the viewpoint of the reactivity with the specific organic silicon compound, those containing curable reactive sites such as hydroxyl groups, epoxy groups, carboxyl groups, amino groups, acid amide groups, ester groups, unsaturated bonds, active hydrogen atoms, halogen atoms or mercapto groups, are preferably employed. Particularly preferred is a fluorine-containing copolymer having hydroxyl groups, epoxy groups, carboxyl groups or amino groups.

In the present invention, typical examples of such suitable addition polymers include a polyvinylidene fluoride, a tetrafluoroethylene-propylene copolymer, a vinylidenefluoride-hexafluoropropylene-tetrafluoroethylene copolymer and a copolymer of a fluoroolefin such as tetrafluoroethylene, chlorotrifluoroethylene or hexafluoropropylene with a certain specific ethylenically unsaturated compound such as vinyl ether, a vinyl ester, an allyl ether, an allyl ester, an acryloyl compound or a methacryloyl compound. Among them, the fluoroolefin-vinyl ether copolymer is preferably employed since it is an addition polymer having a high fluorine content and being soluble in a solvent.

The fluoroolefin-specific ethylenically unsaturated compound copolymer suitable for use in the present invention includes the one comprising from 30 to 70 mol % of fluoroolefin units and from 70 to 30 mol % of specific ethylenically unsaturated compound units and having a specific viscosity of from 0.05 to 2.0 dl/g as measured in an uncured state in tetrahydrofuran at 30° C. Preferred fluoroolefin components include fluoroolefins having from 2 to 4 carbon atoms such as tetrafluoroethylene, chlorotrifluoroethylene, trifluoroethylene, vinylidene fluoride, hexafluoropropylene and pentafluoropropylene. Particularly preferred are tetrafluoroethylene, chlorotrifluoroethylene and hexafluoropropylene. Such fluoroolefins may be used alone or in combination as a mixture of two or more. Preferred specific ethylenically unsaturated compound components include a vinyl ether, a vinyl ester, an allyl ether and an allyl ester, since they are highly copolymerizable with the above fluoroolefins. Among them, an alkyl vinyl ether, an alkyl vinyl ester, an alkylallyl ether or an alkylallyl ester, which contains a straight chained, branched or cyclic alkyl group having from 2 to 15 carbon atoms, is preferred. Particularly preferred is an alkyl vinyl ether. These specific ethylenically unsaturated compounds may be those wherein a part or all of hydrogen atoms bonded to carbon atoms may be substituted by fluorine atoms, such as a fluoroalkyl vinyl ether. Such specific ethylenically unsaturated compounds may be used alone or in combination as a mixture of two or more.

The fluorine-containing copolymer in the present invention has curable reactive sites as mentioned above. Such curable reactive sites may be introduced into the fluorine-containing copolymer by various methods. It is usually preferred to employ a method of copolymerizing a curable reactive site-containing comonomer with the main component such as the above-mentioned fluoroolefin. The curable reactive site-containing comonomer may be a hydroxyalkyl vinyl ether, a hydroxyalkylallyl ether, a glycidyl vinyl ether, a glycidylallyl ether, an aminoalkyl vinyl ether, an aminoalkylallyl ether, a carboxyalkylallyl ether, acrylic acid or methacrylic acid. Further, it is possible to employ a method wherein a hydrolyzable ester group-containing comonomer such as a vinyl ester or an allyl ester is copolymerized with the main component such as the above-mentioned fluoroolefin, followed by hydrolysis to form curable reactive sites, such as hydroxyl groups or carboxyl group. Further, it is possible to employ a method of reacting a polybasic acid anhydride such as succinic anhydride to a hydroxyl group-containing fluorine-containing copolymer to form carboxyl groups, a method of reacting an isocyanate alkyl acrylate to a hydroxyl group-containing fluorine-containing copolymer to introduce unsaturated bonds, or a method of introducing curable reactive sites by various other polymer reactions.

The content of the curable reactive sites in the above-mentioned specific fluorine-containing copolymer can be suitably changed. However, if the content is too small, the cross-linking reaction does not adequately proceed, and the cross-linking density will be insufficient, whereby it will be difficult to obtain a strong coating film. On the other hand, if the content is excessive, the cross-linking density tends to be too great, the resulting coating film tends to be brittle, and the shrinkage stress resulting from the curing reaction tends to be great, whereby the adhesion to the substrate tends to be poor. Accordingly, the content of the curable reactive site-containing unit is usually selected within a range of from 0.5 to 40 mol %, preferably from 1 to 30 mol %. Further, in the case where the curable reactive sites are hydroxyl groups, the content of the curable reactive sites may be selected so that the hydroxyl value of the fluorine-containing copolymer will be within the range of from 2 to 200 mg KOH/g-polymer, preferably from 5 to 150 mg KOH/g-polymer. Such a fluorine-containing copolymer can be produced by copolymerizing a monomer mixture having a predetermined composition by applying polymerization initiating source such as a polymerization initiator or ionizable radiation to the monomer mixture in the presence or absence of a polymerization medium.

As the polyfunctional organic silicon compound in the present invention, a compound generally called a silyl isocyanate is employed. Such an organic silicon compound must contain at least one isocyanate group directly bonded to a silicon atom, in one molecule. This isocyanate group is one of the functional groups for the purpose of the present invention. The silicon compound may contain, in addition to such a group, a functional group reactive with the above-mentioned curable reactive sites, or a group capable of being converted by e.g. hydrolysis to a functional group reactive with the above-mentioned curable reactive sites. As such a functional group, a hydrolyzable group such as an alkoxy group directly bonded to the silicon atom may be mentioned. The polyfunctional organic silicon compound must contain at least two functional groups including the above-mentioned isocyanate group. Namely, if the compound has at least two isocyanate groups, no other functional groups may be present. If the compound has one isocyanate group, at least one other functional groups must be present. As such a polyfunctional organic silicon compound, it is preferred to employ a compound of the formula $R_{4-p}Si(-N=C=O)_p$ wherein p is an integer of from 1 to 4 and R is an organic group, provided that when p is 1, at least one of three R groups is a hydrolyzable organic group. When a plurality of R groups is present (i.e. when p is 1 or 2), the plurality of R groups may be the same or different. R is a hydrolyzable group such as an alkoxy group or may be other organic group. As mentioned above, when p is 1, at least one of three R groups is a hydrolyzable organic group. When R is a hydrolyzable group, it is preferably an alkoxy group, but it is not limited to an alkoxy group and may be other hydrolyzable group such as an acyloxy group. As the alkoxy group, an alkoxy group having from at least 4 carbon atoms, particularly a methoxy or ethoxy group, is preferred. When R is not a hydrolyzable group, it is preferably an organic group having a carbon atom bonded to a silicon atom, such as an alkyl group, an alkenyl group, a cycloalkyl group, an aryl group or an arylalkyl group. Preferably, an alkyl or alkenyl group having not more than 18 carbon atoms, or a phenyl or benzyl group which may have substituents, may be employed. Most preferably, an alkyl group having not more than 4 carbon atoms or a phenyl group is employed. Specific examples include silyl tetraisocyanate $Si(N=C=O)_4$, methylsilyl triisocyanate $CH_3Si(N=C=O)_3$, butylsilyl triisocyanate $C_4H_9Si(N=C=O)_3$, octylsilyl triisocyanate $C_8H_{17}Si(N=C=O)_3$, methoxysilyl triisocyanate $CH_3OSi(N=C=O)_3$, ethoxysilyl triisocyanate $C_2H_5OSi(N=C=O)_3$, phenylsilyl triisocyanate

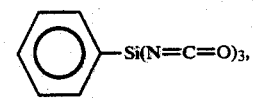

vinylsilyl triisocyanate $CH_2=CHSi(N=C=O)_3$, dimethylsilyl diisocyanate $(CH_3)_2Si(N=C=O)_2$, methylphenylsilyl diisocyanate

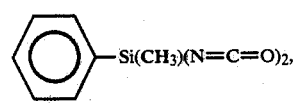

dimethoxysilyl diisocyanate $(CH_3O)_2Si(N=C=O)_2$ and dibutoxysilyl diisocyanate $(C_4H_9O)_2Si(N=C=O)_2$.

In the present invention, among the polyfunctional organic silicon compounds of the above formula, those wherein p is at least 2 i.e. those having at least two isocyanate groups directly bonded to the silicon atom, are preferably employed, since they have excellent reactivity. When a polyfunctional organic silicon compound (p=4) having four isocyanate groups directly bonded to the silicon atom is used alone, the curing time will be extremely short, whereby there may be a difficulty in the coating operation depending upon the coating method. In view of the curing rate and the coating operation, it is preferred to use a polyfunctional organic silicon compound (p=3) having three isocyanate groups directly bonded to the silicon compound or to use a mixture of polyfunctional organic silicon compounds (mixture of p=2 to 4) having from 2 to 4 isocyanate groups directly bonded to the silicon atom.

When the isocyanate groups of these polyfunctional organic silicon compounds are blocked with suitable organic groups, the heat resistance and adhesion to the substrate may be good, but a baking operation will be required for the formation of the coating film, such being not desirable. Namely, the above isocyanate groups are preferably free isocyanate groups i.e. being not blocked.

In the present invention, the polyfunctional organic silicon compounds may be used alone or in combination as a mixture of two or more, as mentioned above. Further, partially condensed polyfunctional organic silicon compounds may also be employed.

In the composition of the present invention, the polyfunctional organic silicon compound is incorporated in a stoichiometrically excess amount to the fluorine-containing copolymer having curable reactive sites. Namely, the polyfunctional organic silicon compound is incorporated in an amount of more than a N/n mol per mol of the fluorine-containing copolymer, where N is the number of the curable reactive sites of the fluorine-containing copolymer and n is the number of the functional groups of the polyfunctional organic silicon compound. Preferably, a polyfunctional organic silicon compound is incorporated in an amount of more than a N/p mol per mol of the fluorine-containing copolymer, where N is as defined above and p is the number of the isocyanate functional groups of the polyfunctional organic silicon compound used. However, since the isocyanate groups readily react with the curable reactive sites, the cross-linking of the fluorine-containing copolymer progresses as the amount of incorporation approaches the N/p mol, whereby the product will be of high viscosity and the reactive groups required for the curing of the final coating composition will be little. Thus, the lower limit for the amount of the polyfunctional organic silicon compound is more preferably a N/(n−1) mol, particularly preferably a N/(p−1). When a polyfunctional organic silicon compound is incorporated in a N mol, an average of one molecule of the polyfunctional organic silicon compound reacts per one curable reactive site of the fluorine-containing copolymer, whereby (n−1) functional groups remains. Further, when a polyfunctional organic silicon compound is incorporated in excess of a N mol, the excess amount of the compound remains unreacted. The content of the unreacted compound should preferably be small. However, the presence of the unreacted compound is not particularly disadvantageous, since it reacts with a curing agent such as the moisture content and cures during the curing operation of the coating material. Preferably, the polyfunctional organic silicon compound is incorporated in an excess amount of not higher than about 10 mol % in excess. Further, when usual fluorine-containing copolymer and polyfunctional organic silicon compound are employed, the weight ratio of the latter to the former is within a range of from 1/100 to 100/1, preferably from 2/100 to 60/100. Particularly preferred is a weight ratio of from 5/10 to 40/100. Such a ratio is desirable from the viewpoint of the adhesion to the substrate and the weather resistance.

When the polyfunctional organic silicon compound is incorporated to the fluorine-containing copolymer having curable reactive sites, the isocyanate groups react with the curable reactive sites simply by mixing, because of the high reactivity of the isocyanate groups. However, the reaction of the isocyanate groups with the curable reactive sites may positively be facilitated by heating or by using a catalyst. The reaction product will have functional groups (isocyanate groups or hydrolyzable groups) derived from the polyfunctional organic silicon compound. Thus, these functional groups will be new curable reactive sites. Such curable reactive sites are capable of reacting with water. For example, two isocyanate groups may be reacted with water to form a urea bond. A hydrolyzable group will react with water to form a silanol group, and two silanol groups will react to form a siloxane bond. Thus, the coating composition of the present invention is capable of being cured by the moisture in air. A coating material of this type is a so-called one-part curing type coating material. Further, the coating composition may be cured by using a curing other than water, such as a polyol or a polyamine. The composition of the present invention is preferably used particularly as the above-mentioned one-part curing type coating material. In order to prepare such a one-part curing type coating material, it is preferred that the fluorine-containing copolymer and the polyfunctional organic silicon compound are preliminarily sufficiently reacted to minimize the change in e.g. the viscosity of the coating composition. When the polyfunctional organic silicon compound is incorporated in an amount of more than a n mol per mol of the fluorine-containing copolymer having N curable reactive sites, the reaction of the two proceeds adequately simply by mixing, whereby there will be no possible gelation. When the polyfunctional organic silicon compound has a blocked isocyanate group, it is not required to preliminarily react it with the fluorine-containing copolymer, and no gelation will take place when they are simply mixed.

The composition of the present invention may preferably contain a solvent in view of the convenience for the coating operation. Various solvents may be used for this purpose. Various commercially available thinners may also be employed, in addition to an aromatic hydrocarbon such as xylene or toluene, an ester such as butyl acetate, a ketone such as methyl isobutyl ketone and a glycol dialkyl ether such as diethyl cellosolve. These solvents may be used in combination as a mixture of various proportions. Such an organic solvent is preferably selected taking into accounts the condition of the object to be coated, the evaporation rate and the environment for the coating operation.

For the preparation of the coating composition of the present invention, various machines commonly employed for the preparation of coating materials, may be employed such as a ball mill, a paint shaker, a sand mill, a jet mill, a triple roll mill or a kneader. At that time, additives such as a pigment, a stabilizer, a viscosity regulating agent, a leveling agent, a gel-preventing agent or an ultraviolet absorber, may be incorporated. Further, the presence of moisture such as humidity should be avoided as far as possible during the preparation. If the preparation is conducted in the presence of moisture, gelation is likely to occur, and the product tends to be hardly suitable as a coating material.

The curing mechanism of the composition of the present invention is not necessarily clearly understood. It is considered, however, that the curing agent undergoes a reaction such as hydrolysis by the action of the moisture in air, whereby cross-linking proceeds. Thus, the composition of the present invention has a one-part curing characteristic. Further, the cured coating film obtained by the composition of the present invention has excellent heat resistance and weather resistance, since the cross-linking structure has high affinity with the substrate containing SiO as the main component such as glass or enamel, whereby the adhesion to the substrate is good. Further, it is believed that the curing mechanism of the composition of the present invention involves a chemical bonding reaction with hydroxyl groups present on the glass surface or in the oxide layer of the metal surface, whereby a coating film having excellent adhesion to the substrate such as glass or metal is obtainable.

Now, the present invention will be described in further detail with reference to Examples and Comparative Examples. However, the present invention is by no means restricted by such specific Examples.

The tests in the Examples and Comparative Examples were conducted as follows.

Heat Resistance Test

A test piece was heated at 180° C. for 8 hours. The yellow index after the heating was measured by 3M color computer, manufactured by Suga Shikenki K.K., and the difference from the value prior to the heating was presented as $\Delta Y$.

Adhesion Test I

A test piece was boiled for 20 hours. Then, to the coating film, cutting lines were formed by a cutter knife crosswise to form 100 squares of 1 mm$^2$. Then, an adhesive tape was pressed thereon and then peeled, whereupon the number X of squares where the coating film remained was counted, and presented as X/100.

Adhesion Test II

Without boiling the test piece, to the coating film, cutting lines were formed by a cutter knife crosswise to form 100 squares of 1 mm$^2$. Then, an adhesive tape was pressed thereon and then peeled, whereupon the number X of squares where the coating film remained was counted and presented as X/100.

Solvent Resistance Test

The surface of the coating film of a test piece was rubbed with a xylene-impregnated gauze, whereupon the condition of the coating film was observed. This operation was repeated until the coating film started dissolution, and the number of repetation was counted. The test was conducted up to 200 times, and when no dissolution of the coating film was observed, the solvent resistance was presented as >200.

Storage Stability

A mixture comprising the fluorinated copolymer, the curing agent, a solvent cases, a curing catalyst, was left at room temperature in a sealed condition, and the time until the mixture cured was measured.

Weather Resistance Test

The gloss retention (%) after irradiation by a sunshine weatherometer for 4,000 hours was measured.

EXAMPLE 1

100 Parts by weight of a fluorine-containing copolymer comprising units derived from chlorotrifluoroethylene/cyclohexyl vinyl ether/ethyl vinyl ether/hydroxybutyl vinyl ether in a ratio of 52.5/19.5/26.3/11.7 (% by weight) and having a specific viscosity of 0.20 dl/g as measured in tetrahydrofuran at 30° C. and 15 parts by weight of methylsilyl triisocyanate (manufactured by Matsumoto Seiyaku K.K.) were mixed to 250 parts by weight of toluene. Such a mixture was coated on a glass sheet having a thickness of 2.5 mm by means of a film applicator in an amount to bring the dried film thickness to about 25 $\mu$m and left to stand and cure at room temperature for 1 day to obtain a test piece.

By using the test piece, each of the above-mentioned tests was conducted. The results are shown in Table 1.

COMPARATIVE EXAMPLES 1 and 2

Test pieces were prepared in the same manner as in Example 1 except that the curing agent, the amount and the curing condition were as shown in Table 1. The test results obtained by using such test pieces are shown in Table 1.

EXAMPLE 2

A test piece was prepared in the same manner as in Example 1 except that carboxyethyl vinyl ether was used instead of the hydroxybutyl vinyl ether in the fluorine-containing copolymer (the composition of the copolymer was adjusted so that the molar ratio became the same as the composition of the fluorine-containing copolymer used in Example 1). The test results obtained by using this test piece are shown in Table 1.

EXAMPLE 3

A test piece was prepared in the same manner as in Example 1 except that glycidyl vinyl ether was used instead of the hydroxybutyl vinyl ether in the fluorine-containing copolymer (the composition of the copolymer was the same as the molar ratio of the fluorine-containing copolymer in Example 1). The test results obtained by using this test piece are shown in Table 1.

EXAMPLE 4

A test piece was prepared in the same manner as in Example 1 except that aminoethyl vinyl ether was used instead of the hydroxybutyl vinyl ether in the fluorine-containing copolymer (the composition of the copolymer was the same as the molar ratio of the fluorine-containing copolymer in Example 1). The test results obtained by using this test piece are shown in Table 1.

TABLE 1

| | AA | BB | CC | DD | EE | FF | GG | HH | II |
|---|---|---|---|---|---|---|---|---|---|
| Example 1 | —OH | Methylsilyl tri- | 15 | 3 months | Room temp. | 5 | 100/100 | >200 | 98 |

TABLE 1-continued

| | AA | BB | CC | DD | EE | FF | GG | HH | II |
|---|---|---|---|---|---|---|---|---|---|
| Comparative Example 1 | —OH | isocyanate Colonate EH[1] | 20 | 8 hours | for 1 day Room temp.[3] for 1 day | 60 | 0/100 | 2 | 92 |
| Comparative Example 2 | —OH | Cymel 303[2] | 6 | 3 months | 140° C. for 30 min. | 40 | 0/100 | >200 | —[4] |
| Example 2 | —COOH | Methylsilyl triisocyanate | 15 | 3 months | Room temp. for 1 day | 6 | 100/100 | >200 | 94 |
| Example 3 | $-CH-CH_2$ with O bridge | Methylsilyl triisocyanate | 15 | 3 months | Room temp. for 1 day | 7 | 100/100 | >200 | 98 |
| Example 4 | —NH$_2$ | Methylsilyl triisocyanate | 15 | 3 months | Room temp. for 1 day | 12 | 100/100 | >200 | 98 |

Notes:
AA: Curable reactive sites of fluorine-containing copolymer
BB: Curing agent
CC: Amount of curing agent (parts by weight)
DD: Storage stability
EE: Curing condition
FF: Heat resistance test (ΔY)
GG: Adhesion test I
HH: Solvent resistance test
II: Weather resistance test (%)
[1]Isocyanate curing agent (manufactured by Nippon Polyurethane K.K.), and 7 ppm of dibutyltin dilaurate was added as a curing catalyst.
[2]Melamine resin (manufactured by Mitsui Toatsu), and 0.5 part by weight of Catalyst 6000 (trade name, manufactured by Mitsui Toatsu) was added as a catalyst.
[3]The curing condition for the weather resistance test was changed to room temperature for 7 days.
[4]The coating film peeled during the weather resistance test.

EXAMPLES 5 to 8

Test pieces were prepared in the same manner as in Example 1 except that the curing agents as identified in Table 2 were used. The test results obtained by using these test pieces are shown in Table 2.

EXAMPLE 9

A test piece was prepared in the same manner as in Example 1 except that a modified copolymer obtained by reacting a fluorine-containing copolymer comprising units derived from chlorotrifluoroethylene/cyclohexyl vinyl ether/ethyl vinyl ether/hydroxybutyl vinyl ether in a ratio of 56/10/10/24 (% by weight), with succinic anhydride in xylene in the presence of triethylamine to modify 10 mol % of the hydroxyl groups as units derived from the hydroxybutyl vinyl ether to carboxyl groups, was used as the fluorine-containing copolymer. The test results obtained by using this test piece are shown in Table 2.

EXAMPLE 10

A test piece was prepared in the same manner as in Example 1 except that a fluorine-containing copolymer comprising units derived from tetrafluoroethylene/hydroxyethylallyl ether/ethyl vinyl ester in a ratio of 62/12/26 (% by weight) was used as the fluorine-containing copolymer. The test results obtained by using this test piece are shown in Table 2.

EXAMPLE 11

A test piece was prepared in the same manner as in Example 1 except that a fluorine-containing copolymer comprising units derived from hexafluoropropylene/glycidyl vinyl ether/propylene in a ratio of 70/12/18 (% by weight) was used as the fluorine-containing copolymer. The test results obtained by using this test piece are shown in Table 2.

TABLE 2

| | AA | BB | CC | DD | EE | FF | GG | HH | II |
|---|---|---|---|---|---|---|---|---|---|
| Example 5 | —OH | Dimethylsilyl diisocyanate | 23 | at least 3 months | Room temp. for 1 day | 6 | — | 50 | — |
| Example 6 | —OH | Silyl tetraisocyanate | 11 | 10 min. | Room temp. for 1 day | 8 | 100/100 | >200 | — |
| Example 7 | —OH | Methoxysilyl triisocyanate | 17 | 5 months | Room temp. for 1 day | 7 | 100/100 | >200 | 90 |
| Example 8 | —OH | Octyloxysilyl triisocyanate | 20 | 4 months | Room temp. for 1 day | 5 | 100/100 | >200 | 91 |
| Example 9 | { —OH, —COOH } | Methylsilyl triisocyanate | 15 | 3 months | Room temp. for 1 day | 6 | 100/100 | >200 | 93 |
| Example 10 | —OH | Methylsilyl triisocyanate | 15 | 3 months | Room temp. for 1 day | 5 | 100/100 | >200 | 97 |

TABLE 2-continued

| | AA | BB | CC | DD | EE | FF | GG | HH | II |
|---|---|---|---|---|---|---|---|---|---|
| Example 11 | 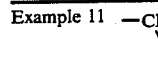 | Methylsilyl triisocyanate | 15 | 3 months | Room temp. for 1 day | 6 | 100/100 | >200 | 100 |

Notes:
AA: Curable reactive sites of fluorine-containing copolymer
BB: Curing agent
CC: Amount of curing agent (parts by weight)
DD: Storage stability
EE: Curing condition
FF: Heat resistance test (ΔY)
GG: Adhesion test I
HH: Solvent resistance test
II: Weather resistance test (%)

EXAMPLE 12

100 Parts by weight of the fluorine-containing copolymer as used in Example 1, 15 parts by weight of methylsilyl triisocyanate and 100 parts by weight of xylene were uniformly mixed, and the mixture was coated on a degreased stainless steel plate and cured at room temperature for 1 day to obtain a test piece. This test piece was subjected to the adhesion test II, whereby the result was 100/100. Further, this test piece was boiled for 2 hours, and then subjected to the adhesion test II, whereby the result was again 100/100.

COMPARATIVE EXAMPLE 3

100 Parts by weight of the fluorine-containing copolymer as used in Example 1, 18.5 parts by weight of an isocyanate curing agent (Colonate EH, manufactured by Nippon Polyurethane K.K.), $7 \times 10^{-3}$ part by weight of dibutyltin dilaurate and 150 parts by weight of xylene were uniformly mixed, and the mixture was coated on a degreased stainless steel plate and cured at room temperature for 7 days to obtain a test piece. This test piece was subjected to the adhesion test II, whereby the result was 20/100. This test piece was boiled for 2 hours and then subjected to the adhesion test II, whereby the result was 0/100.

The composition of the present invention is curable in a one-part system and requires no baking operation at a high temperature, and thus has an advantage that the coating operation is very easy. Further, it exhibits excellent adhesion to a substrate such as glass or metal and has adequate weather resistance and excellent heat resistance. Further, it has an advantage that the curing time is short. The coated product of the present invention has advantages such that no peeling of the coating film from the substrate is likely even without primary treatment, and the gloss will be maintained for a long period of time.

We claim:

1. A coating composition comprising a fluorine-containing copolymer containing at least 10% by weight of fluorine based on fluoroolefin units, being soluble in a solvent and having curable reactive sites, and a polyfunctional organic silicon compound having at least one isocyanate group directly bonded to a silicon atom, said curable reactive sites being capable of reacting with an isocyanate group and the functional groups other than the isocyanate groups of the polyfunctional organic silicon compound being groups capable of reacting with the curable reactive sites of the fluorine-containing copolymer or being hydrolyzable groups each convertible to a silanol group by hydrolysis, any groups attached to silicon of the polyfunctional organic silicon compound other than the isocyanate groups and the hydrolyzable groups being organic groups attached to silicon through a carbon bonded to silicon atom, the solvent being one capable of dissolving both the fluorine-containing copolymer and the polyfunctional organic silicon compound.

2. The composition according to claim 1, wherein the fluorine-containing copolymer is a copolymer which comprises a fluoroolefin and a vinyl ether as copolymer components and which has an intrinsic viscosity of from 0.05 to 2 dl/g as measured in tetrahydrofuran at 30° C. and is soluble in a solvent.

3. The composition according to claim 1, wherein the curable reactive sites are hydroxyl groups, amino groups, carboxyl groups or epoxy groups.

4. The composition according to claim 1, wherein the polyfunctional organic silicon compound is a compound of the formula $R_{4-p}Si(-N=C=O)_p$ wherein p is an integer of from 1 to 4 and R is an organic group, provided that when p is 1, at least one the three R groups is a hydrolyzable organic group.

5. The composition according to claim 1, which comprises 100 parts by weight of the fluorine-containing copolymer and from 2 to 60 parts by weight of the polyfunctional organic silicon compound.

6. The composition according to claim 1, which contains the polyfunctional organic silicon compound in an amount of more than a N/n mol per mol of the fluorine-containing copolymer, where N is the number of the curable reactive sites of the fluorine-containing copolymer and n is the number of the functional groups of the polyfunctional organic silicon compound.

7. A coated product comprising a substrate and a cured coating layer thereon, wherein the coating layer is formed by a coating composition comprising a fluorine-containing copolymer containing at least 10% by weight of fluorine based on fluoroolefin units, being soluble in a solvent and having curable reactive sites, and a polyfunctional organic silicon compound having at least one isocyanate group directly bonded to a silicon atom, said curable reactive sites being capable of reacting with an isocyanate group and the functional groups other than the isocyanate groups of the polyfunctional organic silicon compound being groups capable of reacting with the curable reactive sites of the fluorine-containing copolymer or being hydrolyzable groups each convertible to a silanol group by hydrolysis, any groups attached to silicon of the polyfunctional organic silicon compound other than the isocyanate groups and the hydrolyzable groups being organic groups attached to silicon through a carbon bonded to silicon atom, the solvent being one capable of dissolving both the fluorine-containing copolymer and the polyfunctional organic silicon compound, and the coating layer being cured by a reaction between the curable reactive sites of the fluorine-containing copolymer and the functional groups of the polyfunctional silicon compound.

8. The coated product according to claim 7, wherein the substrate is made of glass.

9. The coated product according to claim 7, wherein the substrate is made of a metal.

10. The composition according to claim 3, wherein the polyfunctional organic silicon compound is a compound of the formula $R_{4-p}Si(-N=C=O)_p$ wherein p is an integer of from 1 to 4 and R is an organic group, provided that when p is 1, at least one of the three R groups is a hydrolyzable organic group.

11. The composition according to claim 10, which comprises 100 parts by weight of the fluorine containing copolymer and from 2 to 60 parts by weight of the polyfunctional organic silicon compound.

12. The composition according to claim 10, which contains the polyfunctional organic silicon compound in an amount of more than a N/n mol per mol of the fluorine-containing copolymer, where N is the number of the curable reactive sites of the fluorine-containing copolymer and n is the number of the functional groups of the polyfunctional organic silicon compound.

13. The composition according to claim 12 wherein a non-hydrolyzable R group is an alkyl group, an alkenyl group, a cycloalkyl group and a hydrolyzable R group is an alkoxy group or an acyloxy group.

14. A coating composition comprising a fluorine-containing copolymer containing at least 10% by weight of fluorine based on fluoroolefin units, being soluble in a solvent and having curable reactive sites, and a polyfunctional organic silicon compound having at least one isocyanate group directly bonded to a silicon atom, the curable reactive sites of the fluorine-containing copolymer being sites each having an active hydrogen atom, an epoxy group, an ester group or a halogen atom in each site, the functional groups other than one or more isocyanate groups of the polyfunctional organic silicon compound being hydrolyzable groups which are convertible to a silanol group by reaction with water, any other group attached to silicon of the polyfunctional organic silicon compound being organic groups attached to silicon through a carbon bonded to the silicon atom, the solvent being one capable of dissolving both the fluorine containing copolymer and the polyfunctional organic silicon compound.

* * * * *